(12) United States Patent
Magnusson et al.

(10) Patent No.: US 10,688,455 B2
(45) Date of Patent: Jun. 23, 2020

(54) HIGH SPEED INJECTOR APPARATUS WITH DUAL THROTTLE BODIES

(71) Applicant: ANDRITZ AKTIEBOLAG, Örnsköldsvik (SE)

(72) Inventors: Åsa Magnusson, Karlstad (SE); Axel Lämås, Karlstad (SE); Johanna Brännström, Karlstad (SE); Anders Lindström, Forshaga (SE)

(73) Assignee: ANDRITZ AKTIEBOLAG, Ornskoldsvik (SE)

( * ) Notice: Subject to any disclaimer, the term of this patent is extended or adjusted under 35 U.S.C. 154(b) by 0 days.

(21) Appl. No.: 16/468,510

(22) PCT Filed: Dec. 13, 2017

(86) PCT No.: PCT/US2017/066229
§ 371 (c)(1),
(2) Date: Jun. 11, 2019

(87) PCT Pub. No.: WO2018/112114
PCT Pub. Date: Jun. 21, 2018

(65) Prior Publication Data
US 2019/0308145 A1    Oct. 10, 2019

Related U.S. Application Data

(60) Provisional application No. 62/433,707, filed on Dec. 13, 2016.

(51) Int. Cl.
*B01F 5/04*       (2006.01)
*B01F 5/06*       (2006.01)
(Continued)

(52) U.S. Cl.
CPC .......... *B01F 5/0483* (2013.01); *B01F 5/0463* (2013.01); *B01F 5/0468* (2013.01);
(Continued)

(58) Field of Classification Search
CPC ...... F04B 7/0046; F04B 13/02; F16K 47/045; F16K 15/035; F16K 5/0407; F16K 3/04;
(Continued)

(56) References Cited

U.S. PATENT DOCUMENTS 1,762,463 A    6/1927    Aeltine et al.
4,609,506 A    9/1986    Berglund
(Continued)

FOREIGN PATENT DOCUMENTS

GB            723113 A       2/1955
WO      2017001215 A1       6/2017

*Primary Examiner* — Stephen Hobson
(74) *Attorney, Agent, or Firm* — Nixon & Vanderhye P.C.

(57) ABSTRACT

An apparatus for mixing a first fluid into a flow path of a second fluid, the apparatus comprising: a chamber enclosing the flow path, the chamber including a second fluid first inlet for receiving its respective fluid. The apparatus also includes a second inlet arranged downstream of the first inlet and receiving the first fluid, as well as an outlet arranged downstream of the second inlet for discharging a mixture of the first fluid and the second fluid. The second inlet flows into the flow path and is formed by a shared fluid injector mounted transverse to the axial direction that one fluid and the two fluid flows through its chamber. The flow path includes two respective throttle bodies, each of which is pivotally arranged inside the chamber and attached to opposed sides of the chamber for controlling the flow area of the flow path.

5 Claims, 12 Drawing Sheets

(51) Int. Cl.
*B01F 15/00* (2006.01)
*B01F 15/06* (2006.01)
*F16K 3/04* (2006.01)
*F16K 5/04* (2006.01)
*F16K 15/03* (2006.01)
*F16K 47/04* (2006.01)
*F04B 7/00* (2006.01)
*F04B 13/02* (2006.01)
*B01F 15/04* (2006.01)

(52) U.S. Cl.
CPC .......... *B01F 5/0471* (2013.01); *B01F 5/0491* (2013.01); *B01F 5/0611* (2013.01); *B01F 5/0652* (2013.01); *B01F 15/00* (2013.01); *B01F 15/00337* (2013.01); *B01F 15/00344* (2013.01); *B01F 15/0429* (2013.01); *B01F 15/063* (2013.01); *F04B 7/0046* (2013.01); *F04B 13/02* (2013.01); *F16K 3/04* (2013.01); *F16K 5/0407* (2013.01); *F16K 15/035* (2013.01); *F16K 47/045* (2013.01); *B01F 2015/062* (2013.01); *B01F 2215/0078* (2013.01); *B01F 2215/0431* (2013.01)

(58) Field of Classification Search
CPC ........ B01F 5/0483; B01F 5/0471; B01F 5/00; B01F 15/00344; B01F 15/0429; B01F 5/0463; B01F 5/0652; B01F 5/0468; B01F 7/0046; B01F 5/0491; B01F 5/0611; B01F 15/00337; B01F 15/063; B01F 2015/062; B01F 2215/0078; B01F 2215/0431

See application file for complete search history.

(56) References Cited

U.S. PATENT DOCUMENTS

| | | | | |
|---|---|---|---|---|
| 5,535,770 | A * | 7/1996 | Nurmi | E03F 1/006 137/14 |
| 5,746,246 | A * | 5/1998 | Yokota | F16K 15/033 137/514 |
| 5,769,116 | A * | 6/1998 | Yokota | E03C 1/104 137/514 |
| 5,971,604 | A | 10/1999 | Linga et al. | |
| 6,170,978 | B1 * | 1/2001 | Short | B01F 5/0413 137/893 |
| 9,427,716 | B2 | 8/2016 | Jansson et al. | |
| 2005/0028876 | A1 | 2/2005 | Kline | |
| 2005/0150965 | A1 | 7/2005 | Taylor et al. | |
| 2014/0326323 | A1 * | 11/2014 | Jansson | B01F 5/0471 137/8 |
| 2018/0117541 | A1 * | 5/2018 | Lindstrom | B01F 5/0471 |

* cited by examiner

HIGH SPEED INJECTOR APPARATUS WITH DUAL THROTTLE BODIES

TECHNICAL FIELD

The present disclosure relates to an apparatus and a method for mixing a first fluid with a second fluid, particularly for mixing steam into pulp.

BACKGROUND

This disclosure is an improvement to the apparatus and method for introducing a first fluid into the flow path of a second fluid and use of such an apparatus disclosed in U.S. Pat. No. 9,427,716, issued 30 Aug. 2016.

As used herein, fluid means a gas, a liquid, steam or a mixture of these. As used herein, fluid is also meant to include a system comprising a mixture of solid particles and a liquid or gas, where the mixture has fluid-like properties. One example of such a system is a suspension, for example, a cellulose pulp suspension.

As used herein, introducing one fluid into the flow path of another fluid means injection, mixing, dispersion or other admixing of one fluid, which is also called the admixture fluid, into the flow path of the other fluid.

It is not unusual in industrial processes that fluids are mixed with each other. In for example, the paper industry, it is not unusual that process chemicals, for example, oxygen gas, chlorine dioxide or ozone, are introduced into a flow of pulp suspension. It is also common in this industry that steam is introduced into the flow of pulp suspension with the purpose of heating the pulp suspension.

There are a number of previously known methods and apparatuses for introducing one fluid into another fluid. One problem with these devices is that they are relatively energy intensive and that they require relatively much maintenance.

When introducing one fluid into the flow path of another fluid, it is generally always desirable to obtain a mixing or dispersion of the fluids which is as effective and uniform as possible.

One objective when injecting one fluid into another fluid, particularly when injecting steam into pulp suspension, is to admix i.e., to mix and disperse the added steam.

If the mixing or dispersion is not sufficient, there is a risk of steam bubbles forming in the liquid or suspension, wherein said steam bubbles may subsequently implode. These steam implosions cause pressure shocks in the liquid or suspension, which in their turn may propagate to machine supports, apparatuses and other process equipment and cause knocks and vibrations, which can be so powerful that mechanical damage results. This is especially a problem when a large amount of steam is added to a cellulose pulp suspension and especially to a cellulose pulp suspension of medium consistency. As used herein, a pulp suspension of medium consistency means a pulp suspension having a dry solids content in the range of approx. 8-14%.

Accordingly, there is a need to maximize and improve the mixing and dispersion of the fluids in order to increase efficiency and minimize the risks of damaging equipment.

SUMMARY

Disclosed is an apparatus for mixing a first fluid into a flow path of a second fluid, the apparatus comprising: a chamber enclosing the flow path, the chamber including a second fluid first inlet for receiving its respective fluid. The apparatus also includes a second inlet arranged downstream of the first inlet and receiving the first fluid, as well as an outlet arranged downstream of the second inlet for discharging a mixture of the first fluid and the second fluid. The second inlet flows into the flow path and is formed by a shared fluid injector mounted transverse to the axial direction that one fluid and the two fluid flows through its chamber. The flow path includes two respective throttle bodies, each of which is pivotally arranged inside the chamber and attached to opposed sides of the chamber for controlling the flow area of the flow path.

DESCRIPTION OF EMBODIMENTS

Figure 1:
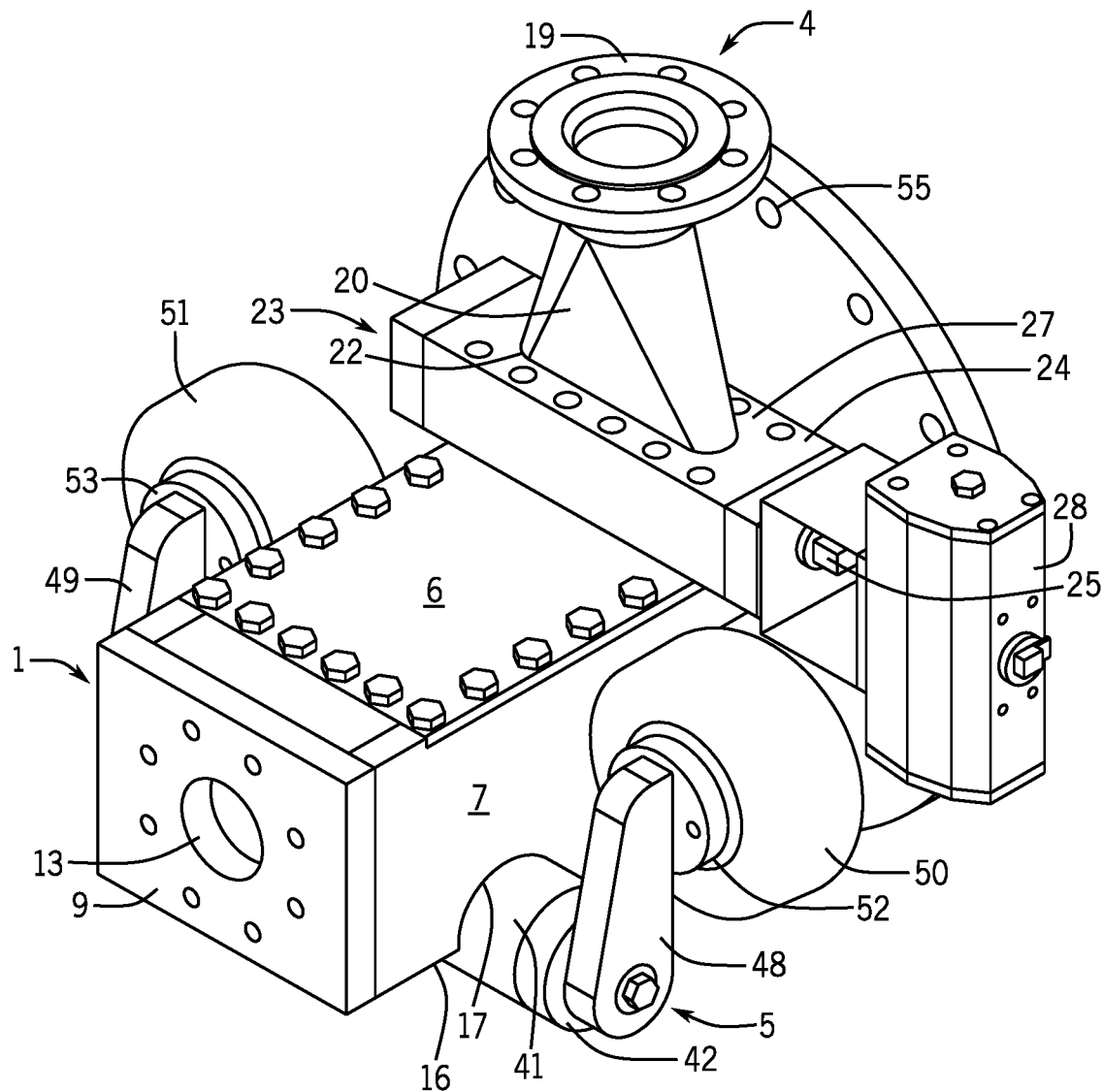
FIG. 1 shows a perspective view of a first, preferred embodiment of an apparatus according to the invention.
Figure 2:
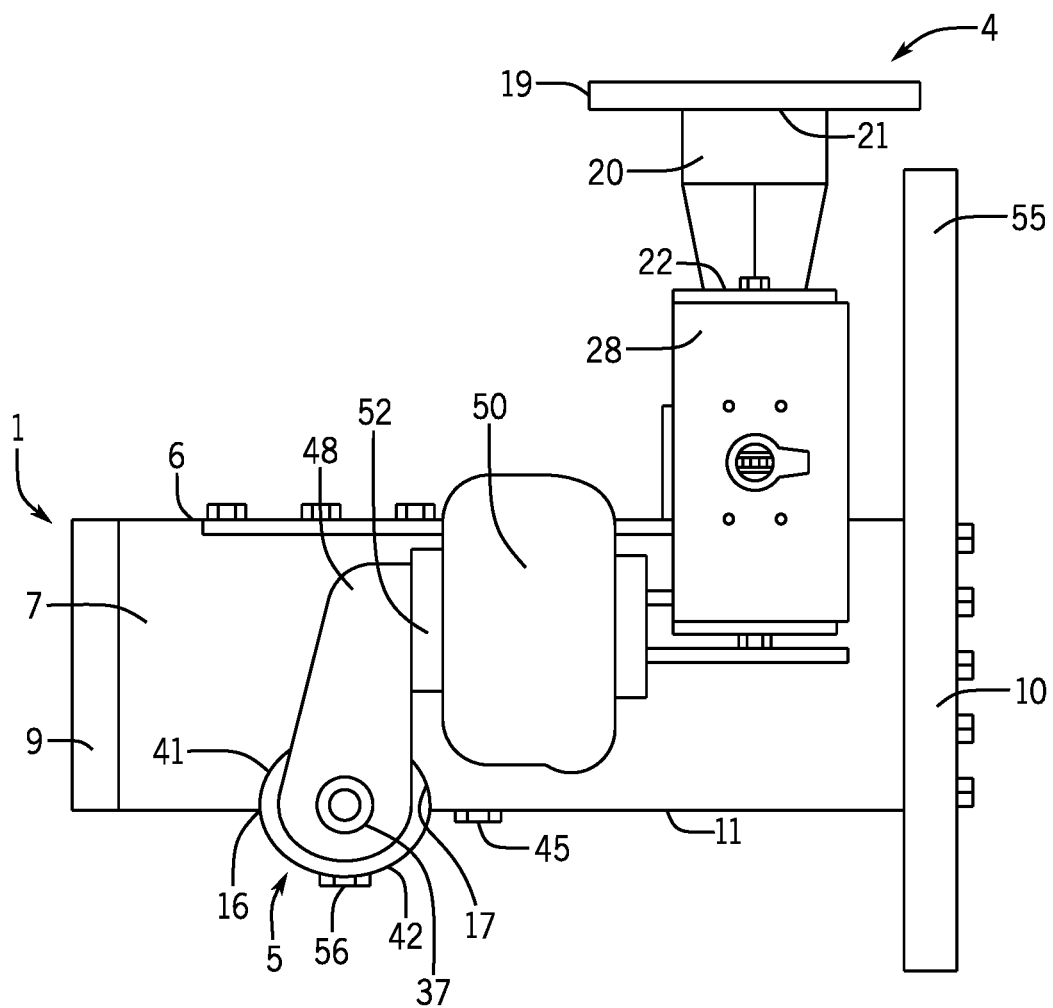
FIG. 2 shows the apparatus of FIG. 1 in a side view.
Figure 3:
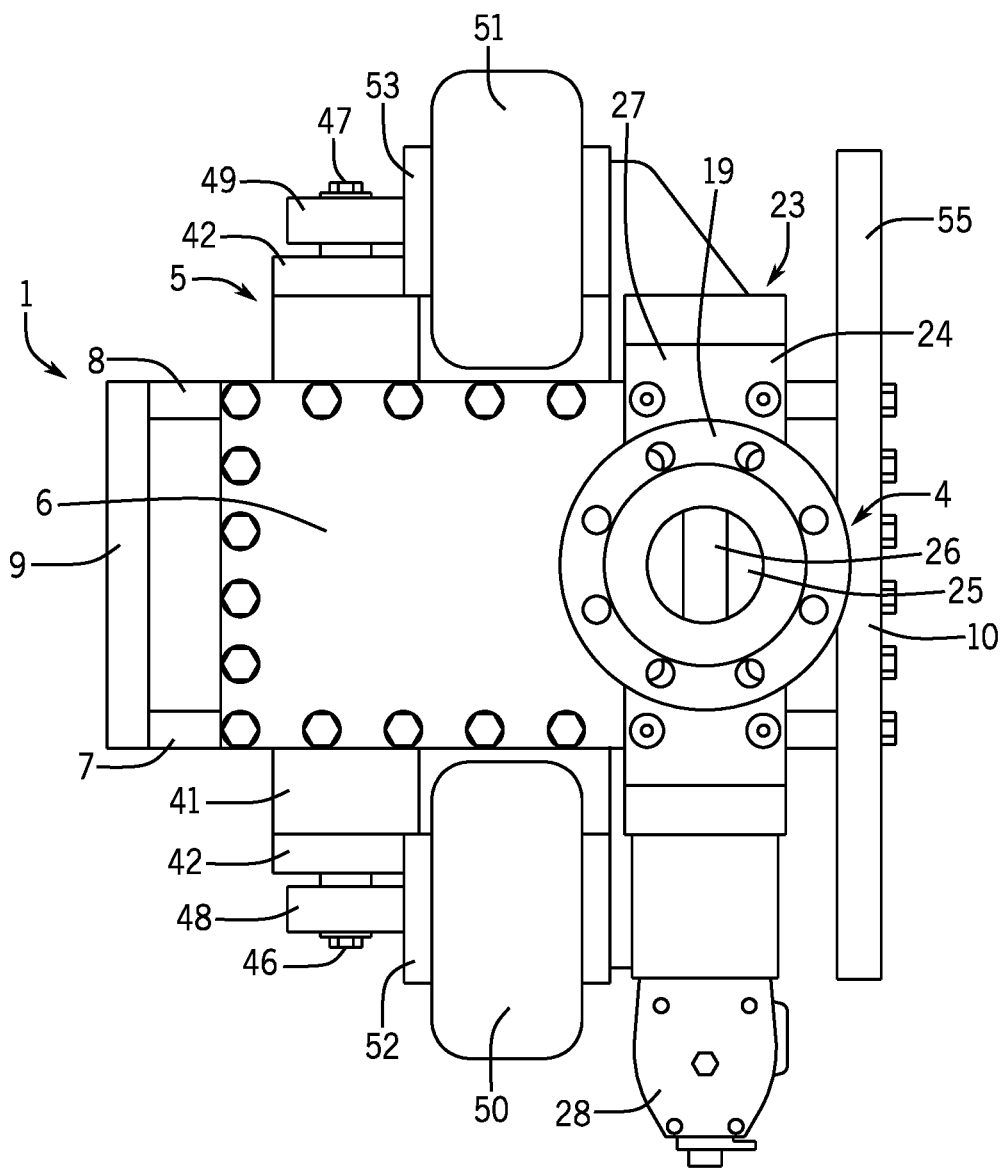
FIG. 3 shows the apparatus of FIG. 1 in a top view.
Figure 4:
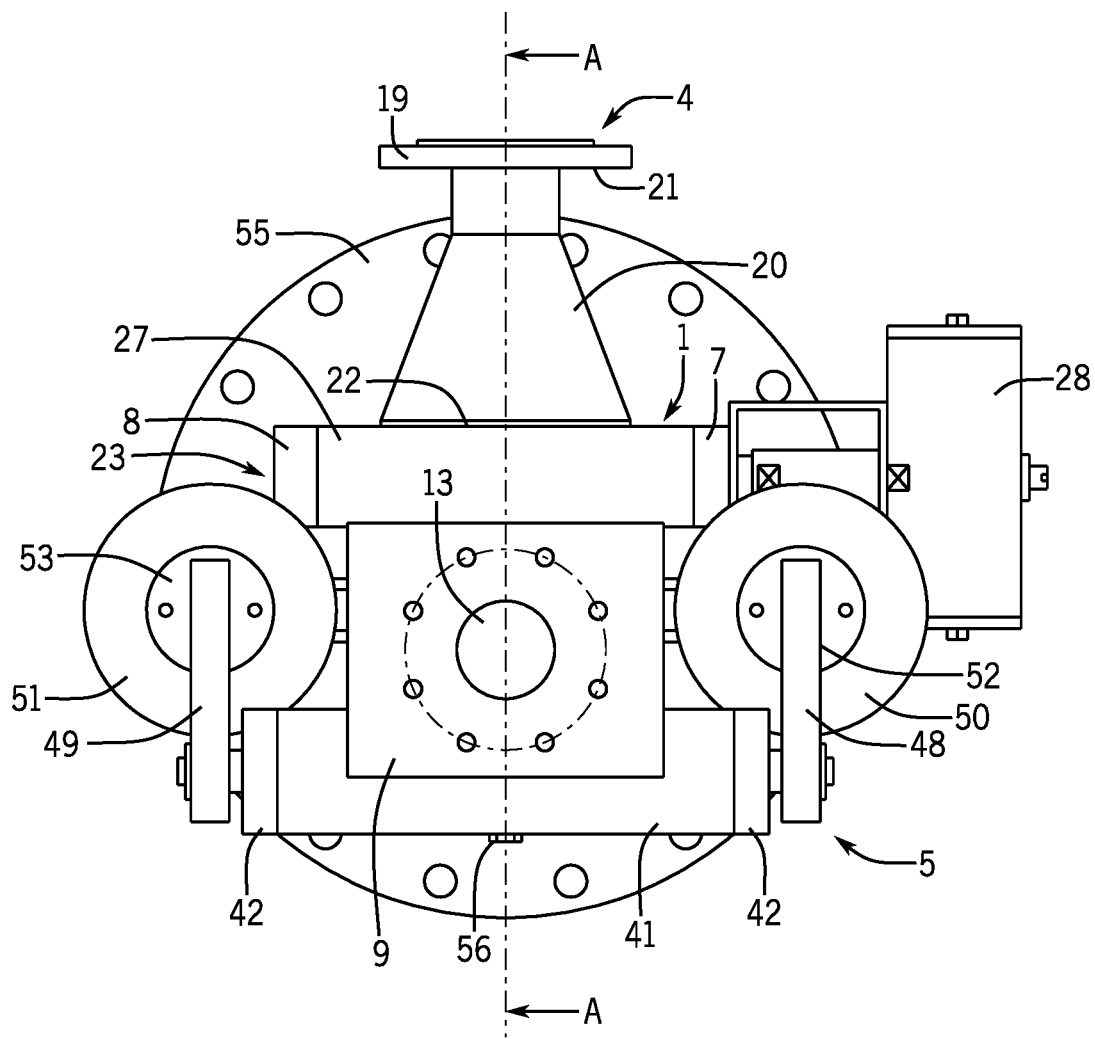
FIG. 4 shows the apparatus of FIG. 1 in a view from behind.

Disclosed is a high-speed injector apparatus intended to be used in a process plant for mixing a second fluid, in the form of steam, into the flow path of a first fluid, in the form of a cellulose pulp suspension, wherein the hot steam is intended for heating the pulp suspension to a desired temperature, for example, to a temperature that is suitable for a subsequent bleaching step. It will be appreciated, however, that the principle of the disclosure may be used for mixing other fluids, such as gases, such as oxygen gas, chlorine gas or ozone, or liquids, such as pH-adjusting liquids, chlorine dioxide or other treatment liquid, into a pulp suspension. It will also be appreciated that the first fluid may be of another type than a pulp suspension, for example, process liquor.

The apparatus comprises a substantially parallelepipedic housing 1, for receiving a pulp suspension from a first conduit 2 located upstream (see FIG. 7), as well as for discharging the pulp suspension into a second conduit 3 located downstream. The apparatus further comprises a supply means 4 for supplying steam to the flow of pulp suspension. The apparatus further comprises a control unit 5, which ensures that there is a suitable flow velocity in the pulp suspension when supplying the steam, in order to avoid the occurrence of steam implosions. Accordingly, the control unit 5 ensures that the flow velocity of the pulp suspension exceeds a certain predetermined minimum value when supplying the steam.

The housing 1 is delimited externally by an upper delimiting surface, constituted by a roof portion 6, lateral delimiting surfaces, constituted by side walls 7 and 8 and by a short side wall 9 located upstream and a short side wall 10 located downstream, and a lower delimiting surface, constituted by a base portion 11.

Internally, the housing 1 comprises a substantially parallelepipedic chamber 12, which is approx. 500-700 mm long, approx. 200-250 mm wide, and approx. 150-300 mm high. The chamber 12 exhibits a circular first inlet 13 for receiving the pulp suspension from the first conduit 2 disposed upstream, and a rectangular outlet 14 for discharging the pulp suspension into the second conduit 3 disposed downstream. The first inlet 13 is formed by an opening in the short side wall 9 located upstream and has a diameter of approx. 80-200 mm. Accordingly, the inlet 13 has an area that is smaller than the cross-sectional area of the chamber 12. The rectangular outlet 14 is substantially equally large as the cross-sectional area of the chamber 12.

Accordingly, the chamber 12 encloses a flow passage 44 for the pulp suspension, said flow passage 44 extending from the first inlet 13 to the outlet 14.

Furthermore, the chamber 12 exhibits an elongated second inlet 15 for receiving the pressurized, hot steam from the supply means 4, said inlet 15 opening into the flow passage 44. The inlet 15 is arranged in the roof portion 6 of the housing and is located approx. 100-150 mm from the outlet 14 of the chamber. The supply means 4 connects to the second inlet 15 from the top side of the roof portion 6. The second inlet 15 is arranged with its longitudinal direction transversely to the chamber 12 and the flow passage 44, i.e. transversely to the flow direction of the pulp suspension, and extends across substantially the entire width of the flow passage 44. In other words, the second inlet 15 has a length that is substantially equal to the width of the chamber 14. The width of the inlet 15, i.e. its extension in the longitudinal direction of the chamber 14, is approx. 25-70 mm.

The base portion 11 exhibits an elongated recess 16, which extends transversely to the longitudinal direction of the chamber 12 close to the first inlet 13, and each of the side walls 7 and 8 exhibit a respective crescent-shaped opening 17, which connects to the recess 16 at the ends thereof. A tubular cover 41 is fixedly disposed in these recesses 16, 17, as is evident from FIGS. 5 and 6. The cover 41 has a length that exceeds the width of the housing 1, for which reason the cover projects outwardly on both sides of the housing 1, as is evident from FIG. 1. The lower portion of the cover 41 protrudes below the chamber 12 and from the base portion 11 of the housing 1. As is most clearly evident from FIG. 6, the central portion of the upper part of the cover 41 has been cut out, so that no part of the cover 41 projects into the chamber 12. Furthermore, this cut-out makes the axial space of the cover 41 accessible from the chamber 12 via the recess 16.

Two removable stoppers 45 and 56 are arranged in the base portion 11 of the housing 1 and in the cover 41. The stoppers 45, 56 enable rinsing of the housing 1 and the cover 41 in case of so-called plugging, i.e. that the pulp suspension clogs the housing 1 and the cover 41.

The supply means 4, for supplying the pressurized, hot steam to the chamber 12 and the flow passage 44 via the second inlet 15, comprises a pipe flange 19 that connects to a steam conduit (not shown) for feeding pressurized steam to the supply means 4. Furthermore, the supply means 4 comprises a pipe part 20, which exhibits a first end 21 and a second end 22. The first end 21 connects to the pipe flange 19 and the second end 21 connects to an elongated valve 23 of the supply means 4. The second end 22 is compressed, as is evident from FIG. 1, making the pipe opening of the second end 22 elongated. The valve 23 connects to the second inlet 15 of the chamber 12 via a screw joint 24. The valve 23 comprises, on the one hand, a pivotal valve spindle 25, exhibiting an elongated longitudinal gap 26 for passage of the steam, and, on the other hand, a valve spindle housing 27, enclosing the valve spindle 25. By turning the valve spindle 25, the valve 23 can be adjusted to a fully open position, to a fully closed position, or to a desired position therebetween. The gap 26 extends across the entire length of the second inlet 15. The position of the valve spindle 25 is controlled by a control means 28, which is disposed on the valve spindle housing 27 at one end of the valve spindle 25.

The distance between the valve spindle 25 and the orifice of the inlet 15 is relatively short, approx. 20-50 mm. This, together with the simple geometry of the outlet, ensures that any pulp suspension, which may have accumulated in the inlet during an interruption of the steam supply, easily can be pushed out by the steam when the steam supply is resumed, which provides for good operating reliability.

The control unit 5 comprises a throttle body in the form of a flap or lip 29, a pivotal axle 37, two lever arms 48 and 49, and pivoting means in the form of two pneumatic cylinders 50 and 51.

Figure 6:
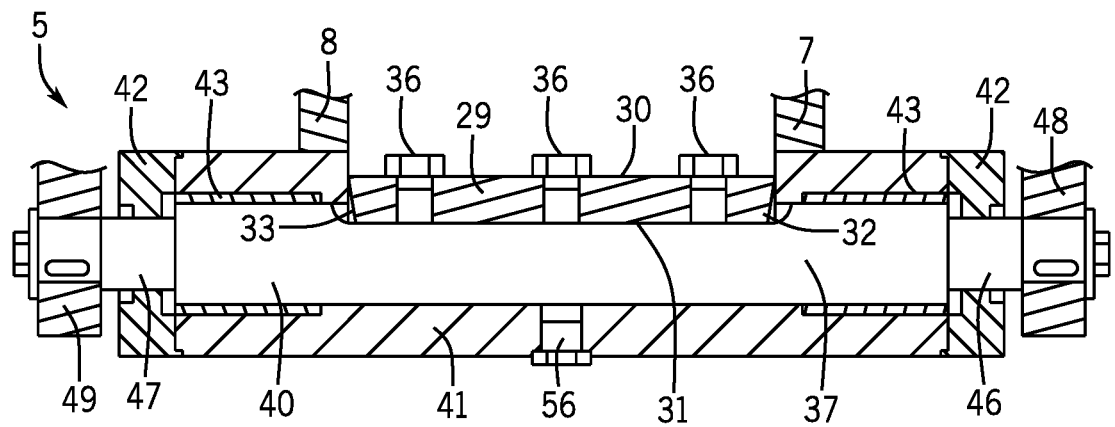
FIG. 6 shows an axle and a flap of the control unit in cross-section taken along the line B-B in FIG. 5.

The axle 37 is pivotally arranged inside the axial space of the cover 41 by means of self-lubricating bearings 43, as is evident from FIG. 6. The axle 37 is longer than the cover 41 and exhibits axle journals 46, 47, projecting outwardly through end plates 42, which are arranged at the ends of the cover 41. Accordingly, the outer portions of the axle journals 46 and 47 constitute projecting ends of the axle 37.

The flap 29 is arranged inside the chamber 12 and has the shape of a substantially rectangular plate, having a thickness of approx. 25-35 mm. The flap 29 exhibits a top side 30, facing away from the base portion 11 of the housing, a bottom side 31, facing toward the base portion 11 of the housing, two parallel long sides 32, 33, facing toward the side walls of the housing, a first end 34 or short side 34 located upstream, and second end 35 or short side 35 located downstream.

The flap 29 has its first end 34 fixedly connected to the pivotal axle 37 by means of bolts 36 and extends, through the recess 16 in the base portion 11, downstream in the flow direction of the pulp suspension. The second end 35 of the flap 29 is free, and its connection to the top side 30 is chamfered, as is evident from FIG. 5. The flap 29 has a length that is approx. 300-450 mm, i.e. slightly longer than the height of the chamber 12 and slightly shorter than the length of the chamber 12, so that its free end 35, located downstream, is substantially aligned with the second inlet 15.

The lever arms 48, 49 are fixedly disposed on the free ends of the axle journals 46, 47 of the axle 37, at right angles to the longitudinal direction of the axle 37. Accordingly, the lever arms 48, 49 rotate together with the axle 37 and the flap 29, when these are turned. The respective lever arm 48, 49 abuts against one of said pneumatic cylinders 50, 51. In the shown embodiment, these pneumatic cylinders are constituted by piston rod-free bellows cylinders 50, 51, which exhibit end plates 52, 53 abutting against the lever arms 48, 49. In the shown embodiment, the respective bellows cylinder 50, 51 is fixedly disposed on a respective side wall 7, 8 of the housing 1.

The flap 29 is pivotable between a lower end position, where the bottom side 31 of the flap abuts against the base portion 11 of the chamber 12, and an upper end position, where the free end 35 of the flap 29 abuts against the roof portion 6 of the chamber 12. The flap 29 has a width that is substantially equal to the width of the chamber 12. Accordingly, when using the apparatus, the pulp suspension is forced to pass over the top side 30 of the flap 29. Thus, the upper end position of the flap 29 constitutes a fully closed position, where the flow passage 44 is fully closed, and the lower end position of the flap 29 constitutes a fully open position, where the flow passage 44 is fully open. Accordingly, when the flap 29 is located between its end positions, the flap 29 forms a constriction in the flow passage 44, where the flow area of the flow passage decreases continuously from the end 34 of the flap 29 located upstream to the free end 35 thereof located downstream. Immediately downstream of the flap 29, i.e. directly downstream of its free end 35, the flow area of the flow passage 44 suddenly increases to its initial value, i.e. to the same value as directly upstream of the flap 29. The inlet 15 opens near the free end 35 of the flap 29, and the steam is thus supplied in the region where the cross-section of the flow passage 44 suddenly increases, which is advantageous for the mixing and dispersion of the steam into the pulp suspension.

Figure 5:
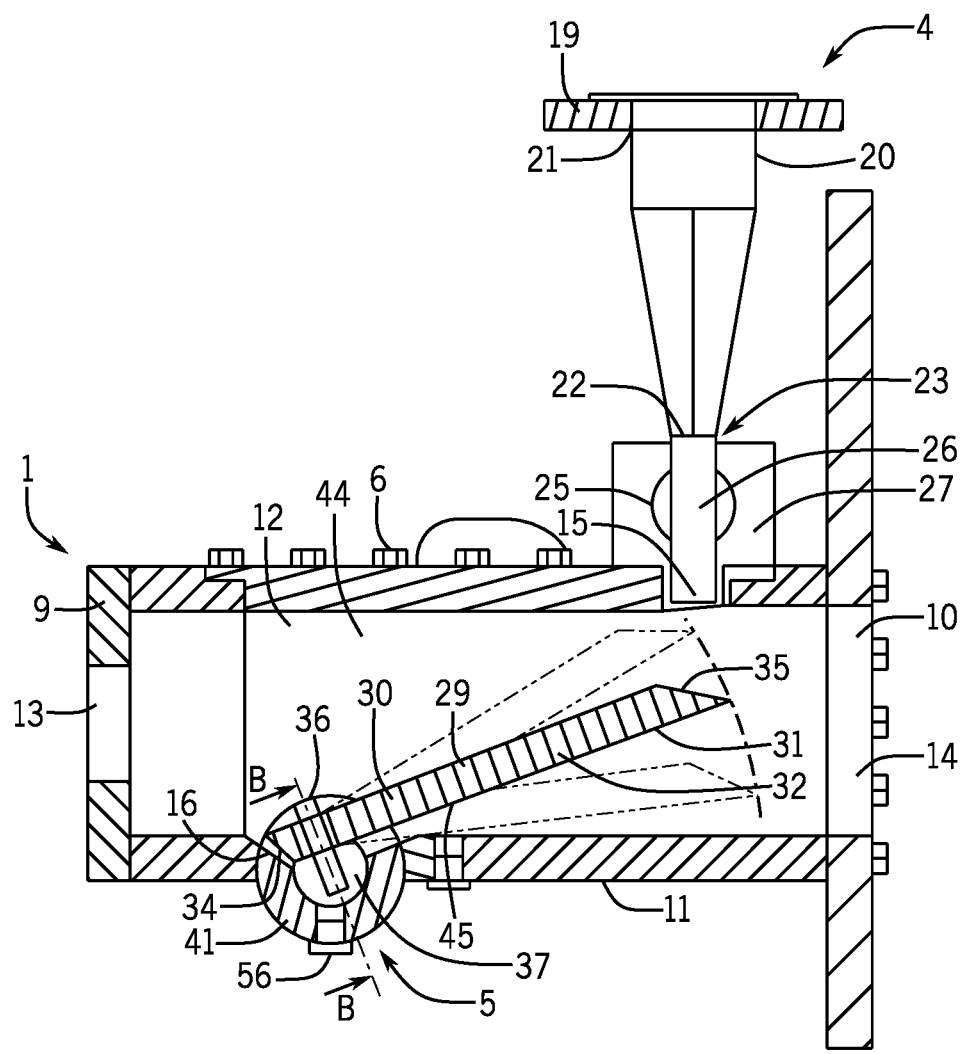
FIG. 5 shows the apparatus of FIG. 1 in a side view, in cross-section, taken along the line A-A in FIG. 4, wherein a control unit of the apparatus is shown in greater detail.

While the pulp suspension passes over the flap 29, the pulp suspension exerts a torque about the axle 37 on the flap 29, which tends to push the flap 29 down, i.e. to pivot the flap 29 clockwise about the axle 37 in FIG. 5. Accordingly, the top side 30 of the flap 29 constitutes a guiding or diverting surface, which diverts the direction of flow of the flow path 44, with which surface the pulp suspension interacts to produce said downward torque. The bellows cylinders 50, 51, in their turn, are pressurized to a predetermined pressure. When they are compressed, they exert a torque on the flap 29, via the lever arms 48, 49 and the axle 37, which strives to push the flap up, i.e. to pivot the flap 29 anti-clockwise about the axle 37 in FIG. 5.

At a constant flow rate of the pulp suspension, the flap 29 adjusts itself to an equilibrium position, where the torque that the flow of pulp suspension exerts on the flap 29 is balanced by the torque that the bellows cylinders 50, 51 exert on the flap 29. In other words, the bellows cylinders 50, 51 are adapted to continuously exert a torque on the flap 29, which balances the torque that the pulp suspension exerts on the flap 29 at every flow rate of the pulp suspension.

If the flow rate of the pulp suspension increases, the flap 29 is pushed down, so that the smallest flow area of the flow passage 44, i.e. its flow area at the end 35, increases. If the flow rate of the pulp suspension stabilizes at this new, higher level, the flap 29 adjusts itself to a new equilibrium position, where the flow area of the flow passage 44 at the end 35 is larger than in the previous equilibrium position. If the flow rate of the pulp suspension decreases, the flap 29 is pushed up by the bellows cylinders 50, 51, so that the flow area of the flow passage 44 at the end 35 decreases. If the flow rate of the pulp suspension stabilizes at this new, lower level, the flap 29 thus adjusts itself to a new equilibrium position, where the flow area of the flow passage 44 at the end 35 is smaller than in the previous equilibrium position. Accordingly, an increasing flow rate of the pulp suspension causes the flow area of the flow passage at the end 35 to increase, and a decreasing flow rate causes the flow area to decrease.

It will be appreciated that this controlling of the flow area compensates for the decrease and increase, respectively, in the flow velocity of the pulp suspension that results from a decrease and an increase, respectively, of its flow rate. If for example, the flow rate of the pulp suspension decreases, also the flow velocity of the pulp suspension in the region upstream of the flap 29 decreases, since the flow area in this region is unchanged. However, due to the decreasing pressure of the pulp suspension on the flap 29 in this situation, the flap is pivoted 29 upward and the flow area at the flap 29 decreases. This, in its turn, implies that the flow velocity of the pulp suspension at the end 35 is maintained at substantially the same level as before the flow rate decrease. If the flow rate of the pulp suspension increases, an adjustment is effected in the other direction, i.e. due to the increasing pressure of the pulp suspension on the flap 29, the flap 29 is pushed down, the flow area above the flap 29 increases, and the flow velocity of the pulp suspension at the end 35 is maintained substantially at the same level as before the flow rate increase. Accordingly, the flap 29 acts as a throttle body, which controls the flow area of the flow passage 44 while being actuated by the cylinders 50, 51, so that the flow velocity of the pulp suspension is maintained within a desired range. Accordingly, the control unit 5 ensures that a decrease of the flow rate of the pulp suspension does not lead to a situation, where the flow velocity of the pulp suspension at the steam supply position falls below a level where the mixing of the steam risks becoming so inadequate that there is a risk of damaging steam implosions occurring.

In addition to the fact that the bellows cylinders 50, 51 abut against the lever arms 48, 49 with a pushing force, the bellows cylinders 50, 51 also dampen any pressure waves which may occur in the pulp suspension, for example, when the pulp suspension passes over the flap 29, or if damaging steam implosions still occur. Accordingly, the bellow cylinders 50, 51 also constitute spring or damping means.

Accordingly, the flap 29 adjusts itself to an equilibrium position, where the flow of pulp suspension imposes a pushing force on the flap 29, which is balanced by the force from the bellows cylinders 50, 51. Thus, the flap 29 is self-adjusting and its actual angle relative to the base portion 11 is dependent on the magnitude of the pulp flow. The predetermined flow velocity range can be set by adjusting the abutting force of the bellows cylinders 50, 51 against the lever arms 48, 49, whereby the desired equilibrium position can be set. By increasing the abutting force of the bellows cylinders 50, 51 against the lever arms 48, 49, the axle 37 is rotated so that the flap 29 is pushed up to a new equilibrium position. This implies that the cross-sectional area above the flap decreases, which causes the flow velocity of the pulp suspension at the second inlet 15 to increase.

Accordingly, the apparatus is self-adjusting in that the control unit 5 ensures that the flow velocity of the pulp flow at the second inlet 15 is always sufficiently high to avoid, or at least reduce the occurrence of steam implosions. The control unit 5 also ensures that an increase of the flow rate of the pulp suspension does not lead to an undesirably high flow resistance across the apparatus.

It will be appreciated that the minimum allowable flow velocity of the pulp suspension at the steam supply position is dependent on a number of factors, for example, the concentration of the pulp suspension, the steam flow rate, i.e. the amount of steam supplied, etc. As an example of a suitable flow velocity range when supplying steam to a pulp suspension, it may be mentioned that, when mixing steam at a flow rate of approx. 2-20 kg/s into a pulp suspension of medium consistency, the flow velocity of the pulp suspension at the free end 35 should be within the range of approx. 30-35 m/s, if the embodiment shown in the figures is used.

Figure 7:
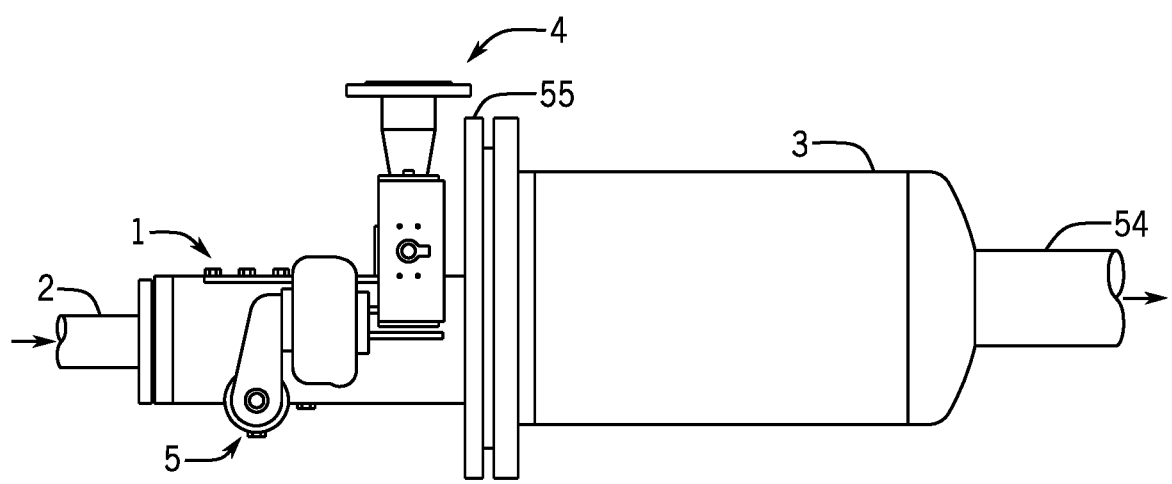
FIG. 7 shows an embodiment where the apparatus comprises a second conduit.

FIG. 7 shows an embodiment of the apparatus that is especially advantageous when supplying steam to a pulp suspension. In this embodiment, the apparatus comprises the second conduit 3 disposed downstream of the chamber 12. The outlet 14 of the chamber 12 connects to the inlet of the second conduit 3 by means of a pipe flange 55, which is fitted to a pipe flange of the second conduit 3. The flow area or cross-sectional area of the second conduit 3 is larger than the cross-sectional area of the outlet 14. In a preferred embodiment, the cross-sectional area of the second conduit 3 is at least 50% larger than the cross-sectional area of the outlet 14. The area increase between the cross-sectional area of the outlet 14 and the cross-sectional area of the second conduit 3 occurs suddenly, in a single step. The length of the second conduit 3 is advantageously from two times all the way up to ten times the diameter, or any other equivalent cross-sectional dimension of the second conduit 3.

Since the cross-sectional area of the second conduit 3 is larger than the cross-sectional area of the outlet 14, the pulp suspension will decelerate after the outlet 14 in those regions of the second conduit 3 which are located radially outside the outlet 14, and be retained against the inside surface of the second conduit 3. Therefore, a volume of fibers will be built up successively by stagnant pulp, along the inside shell surface of the second conduit 3, which can absorb pressure waves in the pulp suspension which may occur due to any steam implosions. The pulp suspension in the middle of the second conduit 3, on the other hand, will continue at a high velocity through the second conduit 3 to a subsequent third conduit 54, which has a diameter that is substantially smaller than the diameter of the second conduit 3.

It will also be appreciated that the apparatus does not necessarily have to comprise a conduit in accordance with the second conduit 3 of FIG. 7. The apparatus can of course be fitted to conduits of any dimensions whatsoever which transport pulp suspensions.

It will also be appreciated that the throttle body may have a different design than the above-described flap 29. The throttle body can for example, be wedge-shaped.

Improved Valve of this Disclosure

Figure 8:
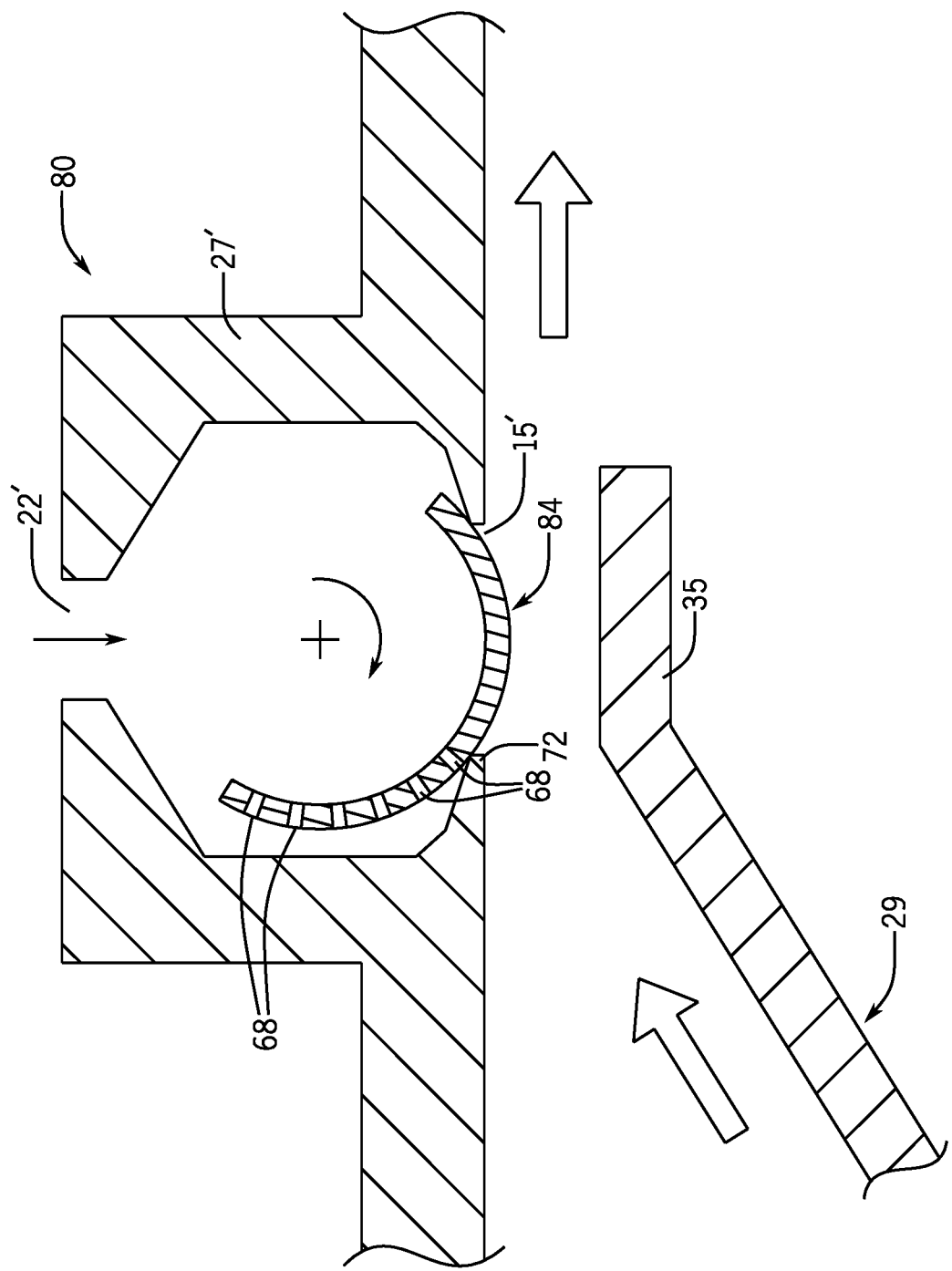
FIG. 8 is a schematic cross-sectional end view of an improved valve according to this disclosure, shown with a valve spindle in the form of a cylinder shown in a valve closed position.

FIG. 8 is a schematic cross-sectional view of an improved valve 80 according to this disclosure, shown with a valve spindle 84 in the form of a cylinder shown in a valve closed position. The valve 80 comprises a valve spindle housing 27' including an inlet 22' and an outlet 15', and the cylinder 84. The cylinder 84 is open along a portion of a longitudinal axis of the cylinder 84 and rotatably mounted in the valve spindle housing 27'. The cylinder 84 in one position is positioned so that the cylinder 84 completely obstructs the valve spindle housing outlet 15', not allowing any fluid to pass around the cylinder 84. The cylinder surface is solid except for having openings 68 through a portion of the cylinder 84, so that when rotated to a first position, the solid portion of the cylinder 84 fully obstructs the valve spindle housing outlet 15', and when rotated to a second position (not shown), fluid can pass into the inside of the cylinder 84 and then through the openings 68 and out of the valve spindle housing 27'.

The valve spindle housing outlet 15' is defined by an opening having an edge 72, and the cylinder 84 is positioned closely adjacent the edge 72 so that when the cylinder 84 is rotated (clockwise as shown in FIG. 8), the edge 72 clears away accumulated material (not shown) over the cylinder openings 68 on the outside of the cylinder 84.

Further, in the embodiment disclosed FIG. 8, the cylinder 84 is about a half cylinder, but in other embodiments, more or less of a cylinder can be used.

Figure 9:
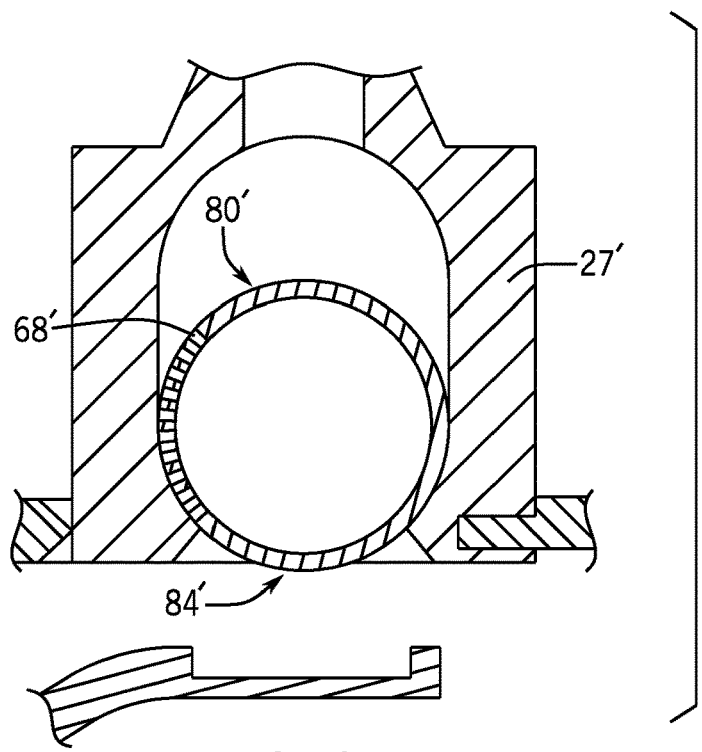
FIG. 9 is an end view of the improved valve shown in FIG. 8.

More particularly, the cylinder 84' of the valve 80' shown in FIGS. 8 and 9 is a whole cylinder, and has a fluid inlet in the form of spaced apart slots 92. In other embodiments (not shown), a single opening can be used.

Figure 10:
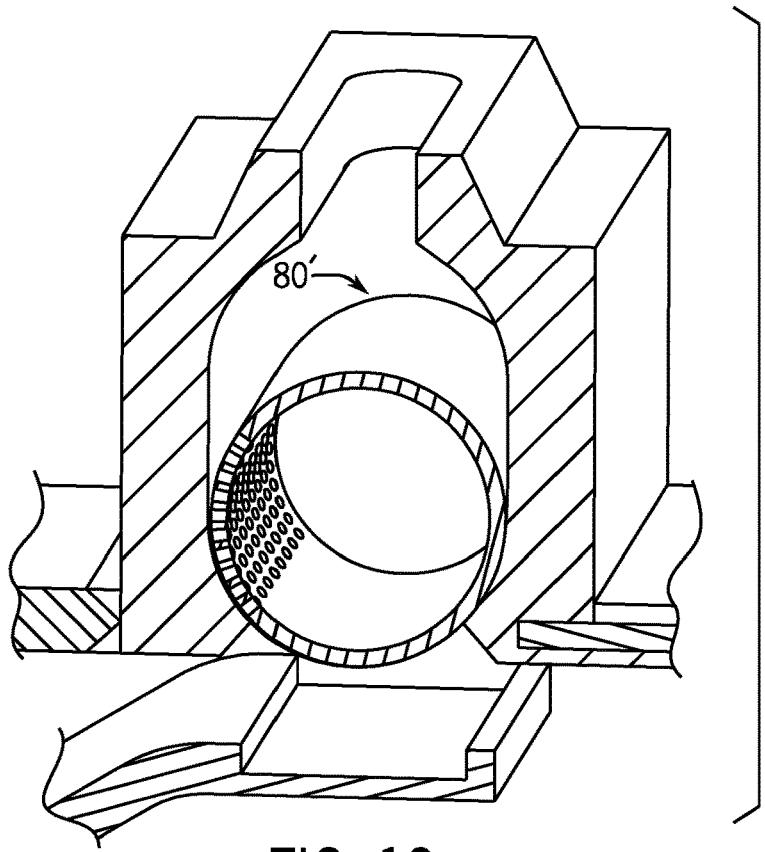
FIG. 10 is a perspective end view of the improved valve shown in FIG. 8.
Figure 11:
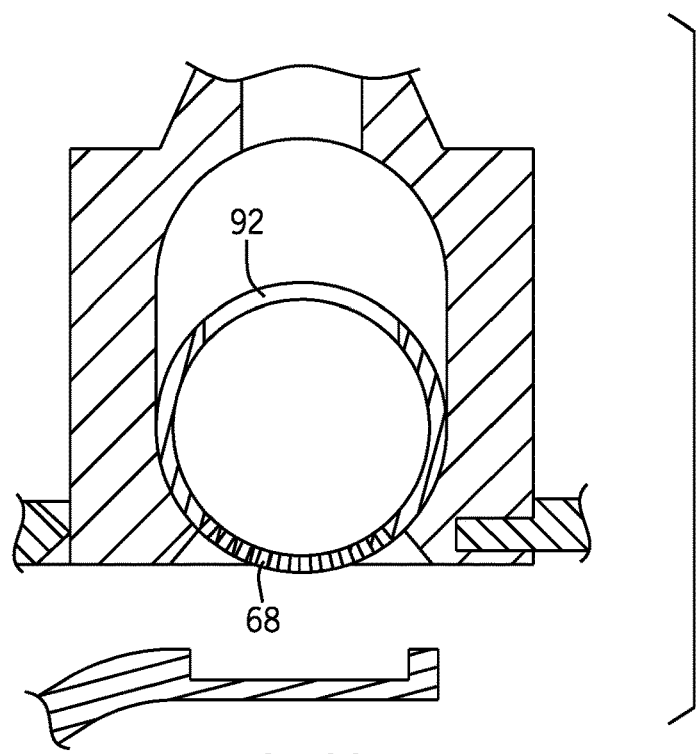
FIG. 11 is an end view of the improved valve shown in FIG. 8, shown with the cylinder shown in a valve open position.
Figure 12:
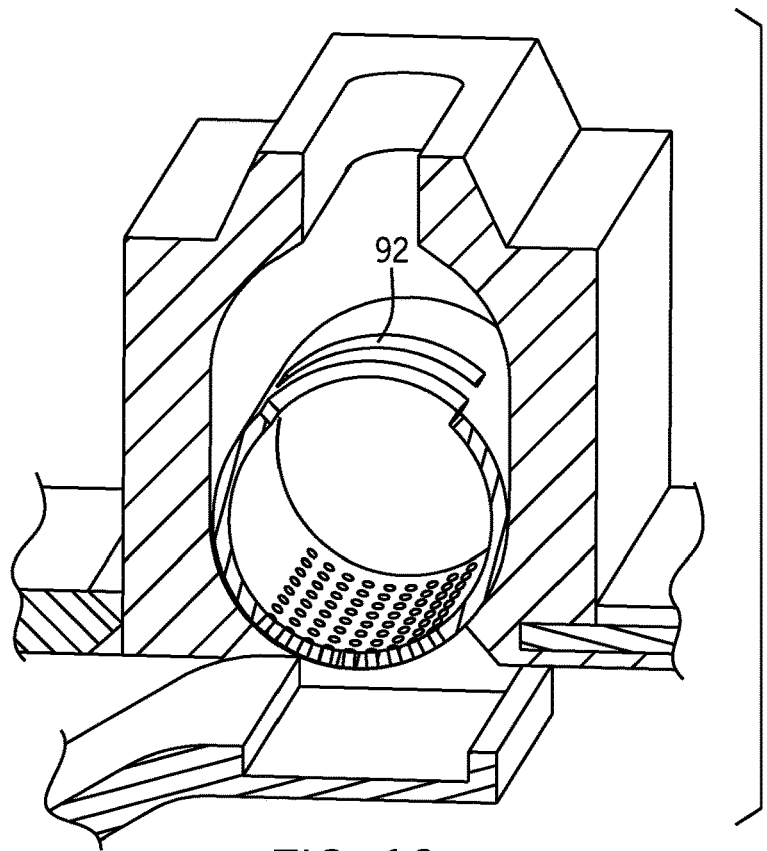
FIG. 12 is a perspective end view of the improved valve shown in FIG. 11.

FIGS. 9 and 10 show the improved valve shown in FIG. 8 with the cylinder 84' in a valve closed position. FIGS. 11 and 12 show the improved valve shown in FIG. 8, with the cylinder 84' shown in a valve open position.

Improved Apparatus of this Disclosure

Illustrated in FIGS. 13-16 is another apparatus 100 for mixing a first fluid into respective flow paths 44' and 44" of a one fluid and a two fluid. Like numbers are used to identify similar elements serving similar functions to those found in the previous embodiment, and include a single or double apostrophe to indicate it is part of this further embodiment.

The disclosed apparatus 100 comprises a first chamber 12' and a second chamber 12", each chamber enclosing a respective flow path 44' and 44". Each chamber includes a respective one fluid or two fluid first inlet 13' and 13" for receiving its respective fluid, a respective second inlet 115 and 115' arranged downstream of the first inlet and receiving the first fluid, as well as an outlet 14' arranged downstream of the respective second inlet 115 and 115' for discharging a mixture of the first fluid and the one fluid and the two fluid. Each flow path extends from its respective first inlet to the outlet. Each second inlet flows into a respective flow path and is formed in a shared fluid injector 80" mounted transverse to the axial direction that one fluid and the two fluid flows through the respective chambers.

In the illustrated embodiment, the one fluid and the two fluid is a second fluid. A splitter (not shown) separates the second fluid into each of the first inlets 13' and 13". By splitting the second fluid between the first inlets, the first fluid second inlet engages twice as much of the second fluid. In other embodiments, the one fluid and the two fluid could be different fluids. Further, each supply to the one fluid or two fluid first inlets can be throttled (not shown), and throttled differently, if desired.

Figure 13:
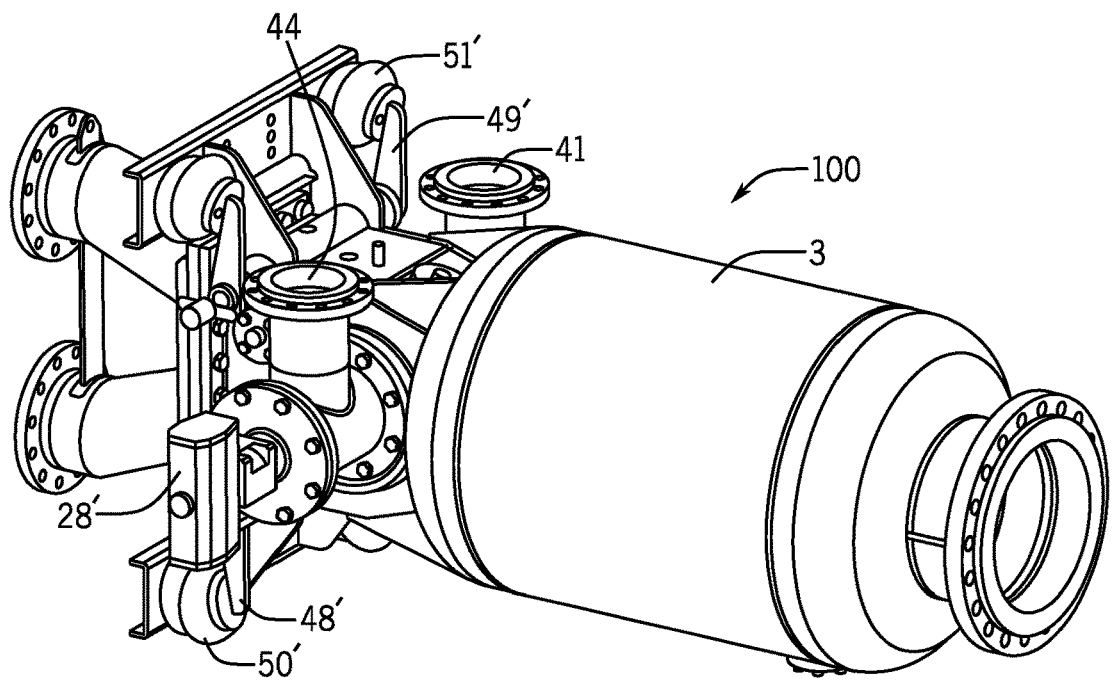
FIG. 13 is a perspective view of a high-speed injector apparatus according to this disclosure.
Figure 15:
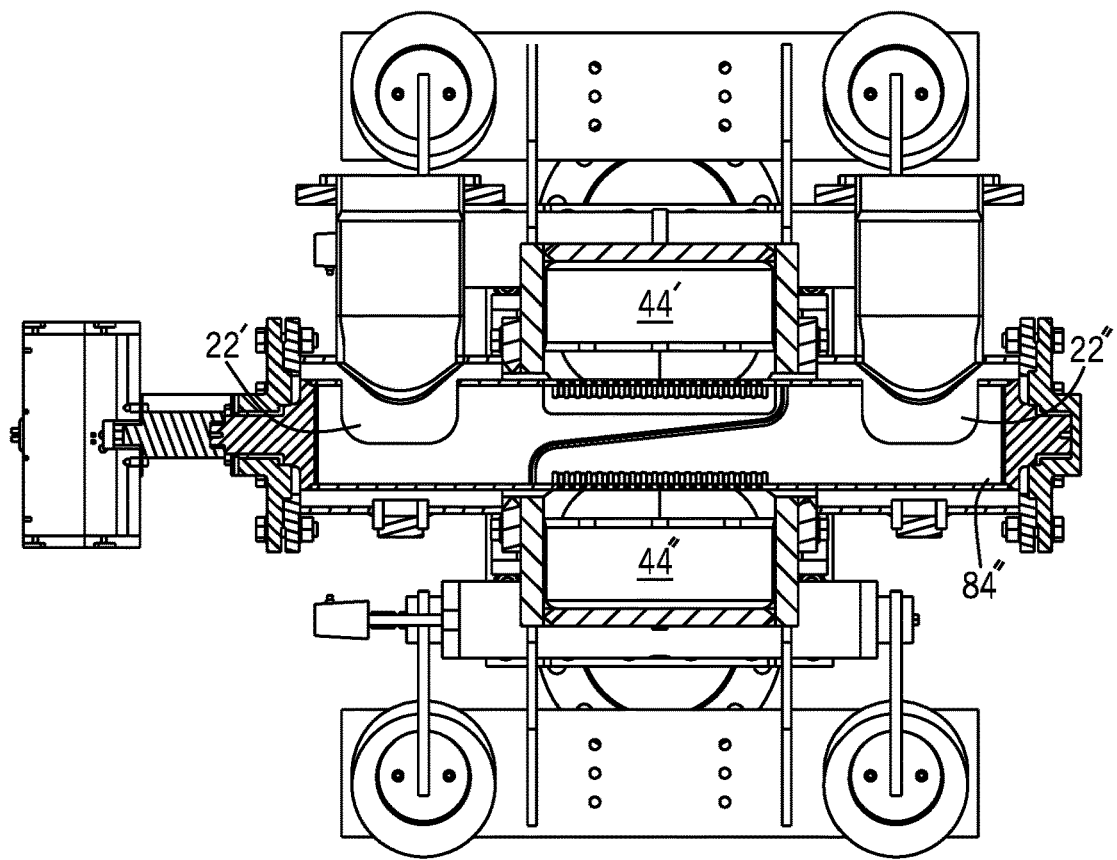
FIG. 15 is a cross sectional view of the high-speed injector apparatus of FIG. 13 taken along the vertical axis of the centrally located first fluid inlet.
Figure 16:
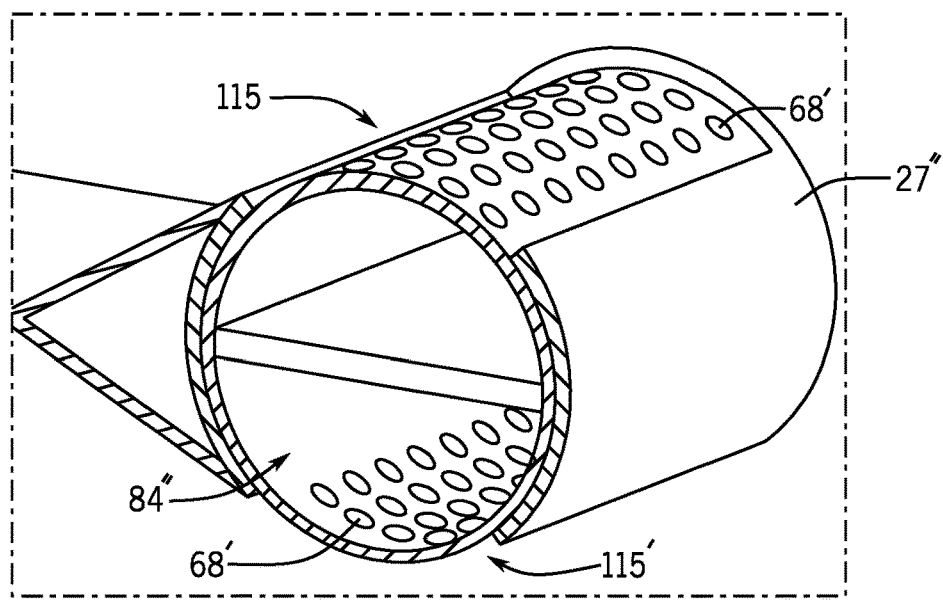
FIG. 16 is a perspective view of a portion of the centrally located second fluid inlet of FIG. 14.

More particularly, as shown in FIGS. 15-16, the fluid injector 80' comprises a valve spindle housing 27" including a first fluid inlet 22' and a respective first fluid outlet 115 and 115', and a cylinder 84" open along a portion of a longitudinal axis of the cylinder 84" and rotatably mounted in the valve spindle housing 27'. More particularly, the spindle housing 27' is cylindrical and has two first fluid outlets 115 and 115' formed by two openings on opposed sides of the spindle housing. Each of the spindle housing first fluid outlets 115 and 115' form a fluid inlet in a respective flow path. In the illustrated embodiment, the cylinder 84" includes two first fluid inlets 22' and 22", one at each end of the cylinder 84", and on the same side of the cylinder 84". Each inlet is attached to its own respective first fluid supply 4' and 4", as illustrated in FIGS. 13 and 15. This allows for twice the volume of the first fluid to enter the cylinder. In this embodiment, the first fluid is introduced into the cylinder through the openings 22' and 22" in the cylindrical side of the cylinder 84", but in other embodiments (not shown), the first fluid could be introduced into the cylinder through the ends of the cylinder.

Figure 14:
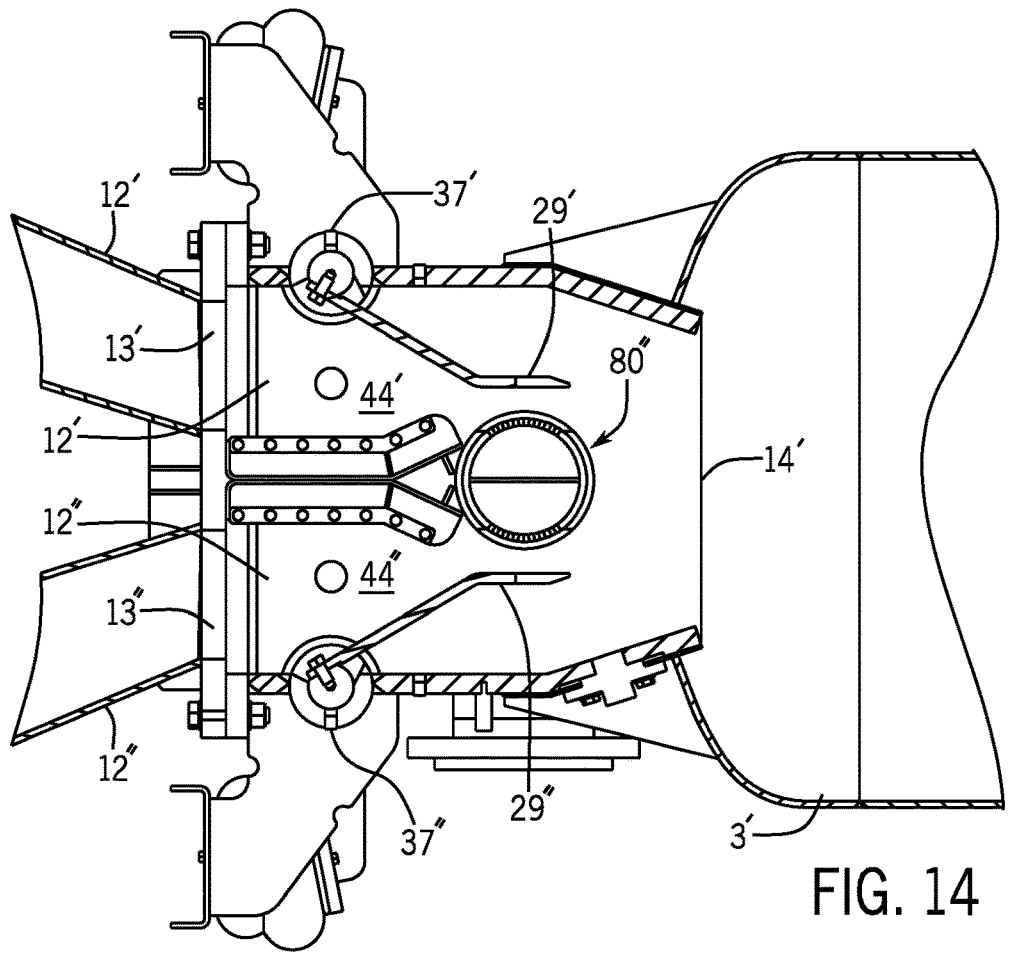
FIG. 14 is a cross sectional view of the high-speed injector apparatus of FIG. 13, taken vertically along its longitudinal axis.

Further, as illustrated in FIGS. 14 and 15, the cylinder 84" includes two first fluid outlets formed by spaced apart sets of perforations 68' on opposed sides of the cylinder that extend along the longitudinal axis of the cylinder. This allows for the discharge of the first fluid into each of the respective one fluid and two fluid paths. In other embodiments (not shown), other outlet shapes other than perforations can be used.

The cylinder 84" in one position is positioned so that the cylinder 84" completely obstructs the valve spindle housing outlets 115 and 115', not allowing any fluid to pass around the cylinder 84", the cylinder walls being solid except for having the openings 68' through a portion of the cylinder 84", so that when rotated to a closed position, the solid portion of the cylinder 84" fully obstructs the valve spindle housing outlets 115 and 115', and when rotated to an open position, the first fluid can pass into the inside of the cylinder 84" and then through the openings 115 and 115' and out of the valve spindle housing 27". Intermediate positions permit variably limited flow through the valve 80".

An advantage of the disclosed valve over conventional valves is that there are two first fluid sealing surfaces. In other words, when the cylinder first fluid outlets 68" are facing the enclosed portion of the spindle housing 27", the valve 80" is closed. Further, when the cylinder outlets 68" face the enclosed portion of the spindle housing 27", the cylinder inlets 22' and 22" are also closed. This dual closure of the valve 80" helps to prevent the passage of the first fluid through the valve when the cylinder is in the closed position.

Further, as illustrated in FIG. 14, each of the flow paths 44' and 44" includes a respective throttle body 29' and 29", which is pivotally arranged inside its respective chamber for controlling the flow area of the respective flow path; and respective pivoting means, for pivoting the throttle body for the controlling of the flow area, the pivoting means being adapted to pivot the throttle body, so that the flow area decreases with a decreasing flow rate of the second fluid and increases with an increasing flow rate of the second fluid in order to maintain a flow velocity of the second fluid at the second inlet within a predetermined range. More particularly, each respective throttle body is in the form of a flap 29' and 29" that has a first end that is pivotally arranged in the chamber and a second end that is free, the free end being directly adjacent the injector second inlet 115 and 115' so that the flap maintains the flow rate of the second fluid at the second inlet in a desired range.

The flap first end is pivotally arranged, via a respective axle 37' and 37", on a wall of the respective chamber opposite the first fluid injector 80". And at least one respective compressively loaded lever arm 48' and 49' is arranged on the axle. The pivoting means comprises a respective pneumatic cylinder 50' and 51', which is adapted to produce the compressive load on the lever arm. Further, the flap 29' and 29" has a width substantially equal to the chamber width.

Figure 17:
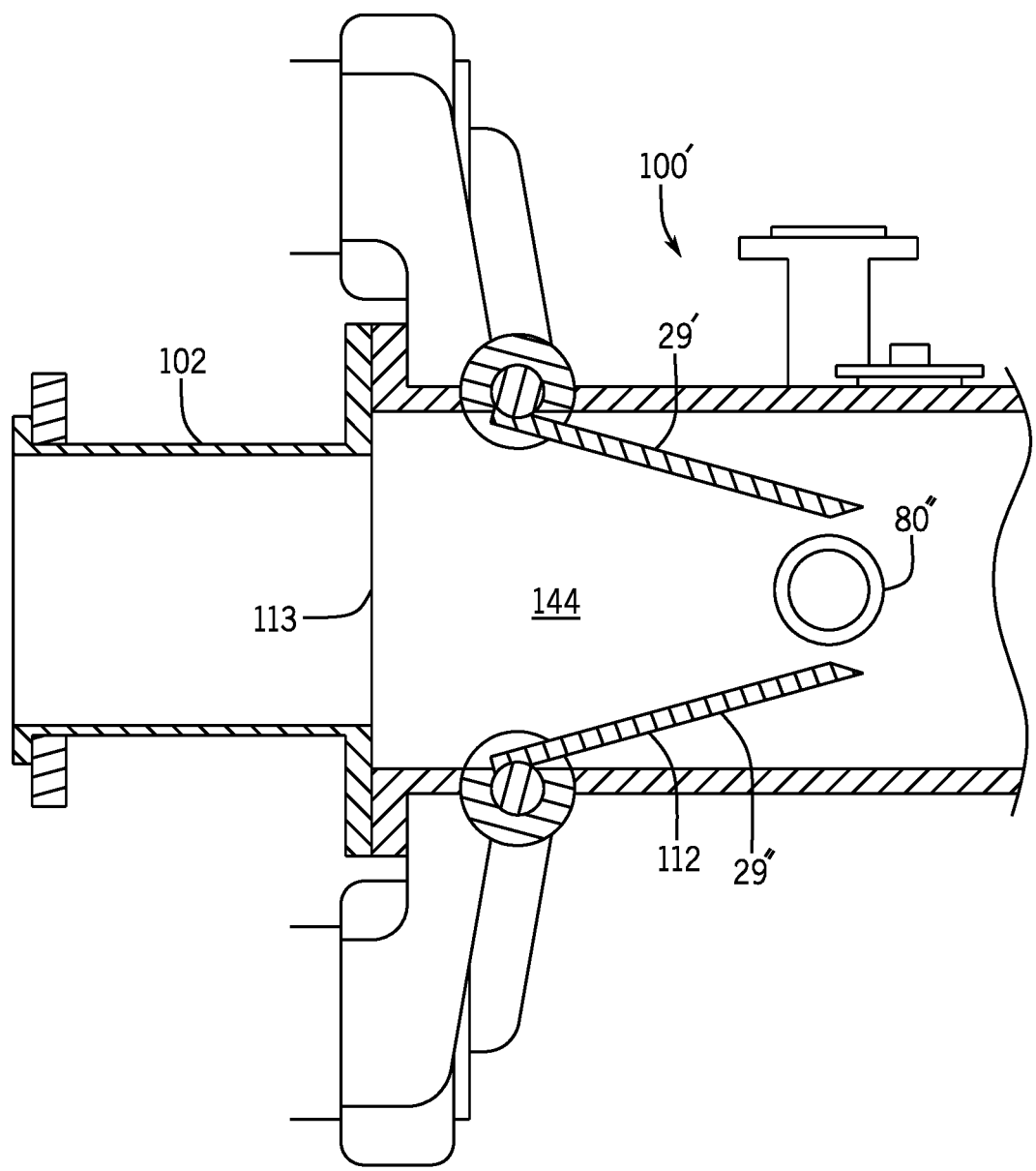
FIG. 17 is a cross sectional view of another embodiment of the high-speed injector apparatus according to this disclosure, taken vertically along its longitudinal axis.

In an alternate embodiment 100', as shown in FIG. 17, instead of having two second fluid inlets 13' and 13", a single second fluid supply 102 and a single second fluid inlet 113 is provided with a single chamber 112 and a single flow path 144 past the injector 80" centrally transversely mounted within the chamber 112.

The invention claimed is:

1. An apparatus for mixing a first fluid into a flow path of a second fluid, said apparatus comprising:
    a chamber enclosing the flow path, the chamber including a second fluid first inlet for receiving the second fluid, a second inlet arranged downstream of the second fluid first inlet and receiving the first fluid, and an outlet arranged downstream of the second inlet for discharging a mixture of the first fluid and the second fluid,
    the flow path extending from the second fluid first inlet to the outlet,
    the second inlet flows into the flow path and is formed by a shared fluid injector mounted transverse to a flow direction of the second fluid and the mixture of the first fluid and the second fluid through the chamber,
    the flow path including two throttle bodies, each of the throttle bodies is pivotally arranged inside the chamber and attached to opposite sides of the chamber for controlling the flow area of the flow path; and
    pivoting means for pivoting each throttle body for said controlling of the flow area, the pivoting means being adapted to pivot the two throttle bodies so that the flow area decreases with a decreasing flow rate of the second fluid and increases with an increasing flow rate of the second fluid to maintain a flow velocity of the second fluid at the second inlet within a predetermined range,
    wherein each respective throttle body is in the form of a flap that has a first end that is pivotally arranged in the chamber and a second end that is free, the second end being directly adjacent the second inlet so that the flap maintains the flow rate of the second fluid at the second inlet in a desired range.

2. The apparatus according to claim 1, wherein the fluid injector comprises:
    a valve spindle housing including a first fluid inlet and a first fluid outlet, and
    a cylinder open along a portion of a longitudinal axis of the cylinder and rotatably mounted in the valve spindle housing, the cylinder being positioned in one position so that the cylinder completely obstructs the valve spindle housing outlet, not allowing any fluid to pass around the cylinder, cylinder walls of the cylinder being solid except for having openings through a portion of the cylinder, so that when rotated to a closed position, the solid portion of the cylinder fully obstructs the valve spindle housing outlet, and when rotated to an open position, the first fluid can pass into the inside of the cylinder and then through the openings and out of the valve spindle housing.

3. The apparatus according to claim 2, wherein the valve spindle housing outlet is defined by an opening having an edge, and the cylinder is positioned closely adjacent the edge so that when the cylinder is rotated, the edge clears away accumulated material over the cylinder openings on the outside of the cylinder.

4. The apparatus according to claim 1, the first end being pivotally arranged, via an axle.

5. The apparatus according to claim 1, wherein each of the flaps has a width substantially equal to the chamber width.

* * * * *